(12) United States Patent
Cleland et al.

(10) Patent No.: US 7,834,555 B2
(45) Date of Patent: Nov. 16, 2010

(54) METHOD AND SYSTEM FOR LUMINANCE CHARACTERIZATION

(75) Inventors: Donald A. Cleland, Langford (CA); Laurence E. Kubek, Victoria (CA); Carol A. Wong, Victoria (CA); Gerald E. Kurz, Brentwood Bay (CA)

(73) Assignee: Streetlight Intelligence, Inc., Victoria, BC (CA)

( * ) Notice: Subject to any disclaimer, the term of this patent is extended or adjusted under 35 U.S.C. 154(b) by 253 days.

(21) Appl. No.: 12/231,478

(22) Filed: Sep. 2, 2008

(65) Prior Publication Data

US 2009/0001893 A1    Jan. 1, 2009

Related U.S. Application Data

(63) Continuation of application No. 11/479,764, filed on Jun. 30, 2006, now Pat. No. 7,429,828.

(60) Provisional application No. 60/695,459, filed on Jun. 30, 2005, provisional application No. 60/702,461, filed on Jul. 26, 2005.

(51) Int. Cl.
*H05B 37/02* (2006.01)

(52) U.S. Cl. ................... 315/149; 315/156; 315/158; 315/159

(58) Field of Classification Search ........... 315/307, 315/308, 291, 149, 150, 156–159
See application file for complete search history.

(56) References Cited

U.S. PATENT DOCUMENTS

| | | | |
|---|---|---|---|
| 3,894,265 A | 7/1975 | Holmes et al. | |
| 4,350,930 A | 9/1982 | Peil et al. | |
| 4,516,056 A | 5/1985 | Cote | |
| 4,647,763 A | 3/1987 | Blake | |
| 4,931,701 A | 6/1990 | Carl | |
| 4,994,718 A | 2/1991 | Gordin | |
| 5,235,252 A | 8/1993 | Blake | |
| 5,327,048 A | 7/1994 | Troy | |
| 5,336,976 A | 8/1994 | Webb et al. | |
| 5,451,843 A | 9/1995 | Kahn et al. | |
| 5,495,329 A | 2/1996 | Anderson, II et al. | |
| 5,701,058 A | 12/1997 | Roth | |
| 5,751,116 A | 5/1998 | Thomas et al. | |

(Continued)

FOREIGN PATENT DOCUMENTS

JP    2003059678    2/2003

*Primary Examiner*—David Hung Vu
(74) *Attorney, Agent, or Firm*—Fish & Richardson P.C.

(57) ABSTRACT

A system for luminance characterization of a luminaire includes a ballast coil and a multi-tap capacitor connected in series with the ballast coil. The multi-tap capacitor has a plurality of tap capacitors integrated into a capacitor housing. A plurality of switches are each coupled to one of the plurality of tap capacitors for selectively coupling the tap capacitors together to produce a multi-tap capacitance corresponding to a configuration of the plurality of switches. A lamp is connected in series with the multi-tap capacitor and the ballast coil. A photometer is located to measure light intensity of the lamp and to produce a lumen output measurement. A memory is used to store a database having a plurality of lumen output measurements, each corresponding to a multi-tap capacitance corresponding to all configurations of the plurality of switches.

17 Claims, 7 Drawing Sheets

U.S. PATENT DOCUMENTS

| | | |
|---|---|---|
| 5,902,994 A | 5/1999 | Lisson et al. |
| 5,962,988 A | 10/1999 | Nuckolls et al. |
| 6,031,340 A | 2/2000 | Brosius |
| 6,057,674 A | 5/2000 | Bangerter |
| 6,114,816 A | 9/2000 | Nuckolls et al. |
| 6,191,568 B1 | 2/2001 | Poletti |
| 6,316,923 B1 | 11/2001 | Poletti |
| 6,393,608 B1 | 5/2002 | Pullford |
| 6,456,373 B1 | 9/2002 | Wienecke et al. |
| 6,577,075 B2 | 6/2003 | Romano et al. |
| 6,841,944 B2 * | 1/2005 | Morrissey et al. ............ 315/119 |
| 6,856,101 B1 | 2/2005 | Hitchcock |
| 7,045,968 B1 * | 5/2006 | Bierman et al. ............. 315/244 |
| 2005/0035720 A1 | 2/2005 | Blake |

* cited by examiner

| LUMEN LEVEL | DIMMING LEVEL | SWITCH SETTING | ADJUSTABLE SWITCH SETTING |
|---|---|---|---|
| $L_0$ | 0 | 000000 | 000001 |
| $L_1$ | 1 | 000001 | 000011 |
| ⋮ | ⋮ | ⋮ | ⋮ |
| $L_{63}$ | 63 | 111111 | 111110 |

| | 902 | 904 | 906 | 908 | 910 |
|---|---|---|---|---|---|
| | TIME | FOOT CANDLES | DIMMING LEVEL | REAL POWER (KW) | POWER FACTOR |
| | 29:44.3 | 563.53 | 0 | 0.183 | −89.912 |
| | 30:14.8 | 559.9 | 1 | 0.182 | −89.867 |
| | ⋮ | ⋮ | ⋮ | ⋮ | ⋮ |
| | 34:54.8 | 144.273 | 62 | 0.086 | −96.316 |
| | 36:05.8 | 140.077 | 63 | 0.085 | −96.139 |

METHOD AND SYSTEM FOR LUMINANCE CHARACTERIZATION

RELATED APPLICATIONS

This application is a continuation of and claims priority from U.S. patent application Ser. No. 11/479,764, filed Jun. 30, 2006, now U.S. Pat. No. 7,429,828, which is hereby incorporated in its entirety by reference. This application also claims priority from Provisional Application Ser. No. 60/695,459, filed on Jun. 30, 2005, and Provisional Application Ser. No. 60/702,461, filed on Jul. 26, 2005, both of which are hereby incorporated herein in their entirety by reference. U.S. patent application Ser. No. 11/479,764 incorporated the following U.S. patent applications by reference and these applications are also hereby incorporated by reference in their entirety: U.S. patent application Ser. No. 11/476,498 filed Jun. 28, 2006; U.S. patent application Ser. No. 11/479,769 filed Jun. 30, 2006; and U.S. patent application Ser. No. 11/479,222 filed Jun. 30, 2006.

FIELD OF THE INVENTION

This invention relates in general to the operation of light fixtures, which can include ballasted high intensity discharge (HID) luminaires, and more specifically to the control, adjustment, compensation, and monitoring of the lumen output from a light fixture.

BACKGROUND OF THE INVENTION

As saving energy becomes more important, it has become desirable to reduce the energy consumption associated with widely used lighting systems and light fixtures, which fixtures can include HID luminaires. At present roadways, highways and residential streets are fully lit throughout the night, despite lighter traffic use between midnight and dawn.

HID lamps, and their lamp fixtures or HID luminaires, are typically used when a high level of light over a large area is required, and when energy efficiency and/or long life are desired. Uses that are well suited for such HID luminaries include gymnasiums, large public areas, warehouses, buildings, signs, outdoor activity areas, sports fields, roadways, parking lots, and pathways. More recently, however, HID sources, especially metal halide, have been used in small retail and residential environments. Conservative estimates suggest there are at least 150 million HID luminaires worldwide on roadways alone.

HID lamps—which includes mercury vapor (MV) lamps, metal halide (MH) lamps, high-pressure sodium (HPS) lamps, low-pressure sodium lamps, and less common, xenon short-arc lamps—have light-producing elements that use a well-stabilized arc discharge contained within a refractory envelope (arc tube).

Light fixtures can have their lumen output adjusted to save energy when full brightness is not needed, such as when lighted areas are not occupied, or during periods of reduced usage. Full brightness can be restored when increased occupancy is detected.

However, there are several problems and difficulties with adjusting and controlling the lumen output of HID lamps. One of the reasons for the problems is that ballasts are required to start the lamp, to regulate the lamp starting and lamp operating currents, and to sustain an appropriate supply voltage. A first problem is that HID lamps require several minutes to ignite, warm-up, and reach their full light output levels. Second, HID lamps also have a hot re-strike problem, which makes them difficult to re-ignite within a short period after being turned off, while they are still at an elevated temperature. Depending upon the ballast-lamp combination, it can take up to 10 minutes after the lamp has been turned off before it can be re-ignited. This poses a practical problem for lamp adjustment applications involving pedestrian conflict or roadway safety where the lamp must be returned, within a very short period of time (i.e. within milliseconds), to an acceptable level of brightness and illumination. If the HID lamp is turned off, it may take several minutes after re-ignition until the lamp warms up sufficiently to produce the desired output.

Several methods can be used for adjusting the lumen output, and the power consumption, of ballasted HID luminaires. A first method uses a variable voltage transformer to reduce the primary voltage supplied to the ballast, thereby achieving lumen adjustment to approximately 60% of the rated lamp power. Typically, in this type of arrangement, an HID luminaire contains a lamp as well as some type of transformer ballast with a series-connected inductance and capacitance (L-C circuit), in the form of a choke and capacitor, for controlling the lamp operating current according to the voltage-current characteristics specified for the ballast-lamp combination.

A second method uses a variable reactor in the ballast circuit to change the lamp current without affecting the voltage. This method allows a wider range of lumen and power adjustment, permitting a reduction to approximately 30% of rated power, depending upon the lamp and ballast combination.

A third method for adjusting lumen output uses solid-state components to change the waveforms of both the current and voltage input to the ballast, which permits adjusting lumen output down to approximately 50% of rated power.

BRIEF DESCRIPTION OF THE DRAWINGS

The accompanying figures, wherein like reference numerals refer to identical or functionally similar elements throughout the separate views and which together with the detailed description below are incorporated in and form part of the specification, serve to further illustrate various embodiments and to explain various principles and advantages, all in accordance with the present invention.

DETAILED DESCRIPTION

Figure 1:
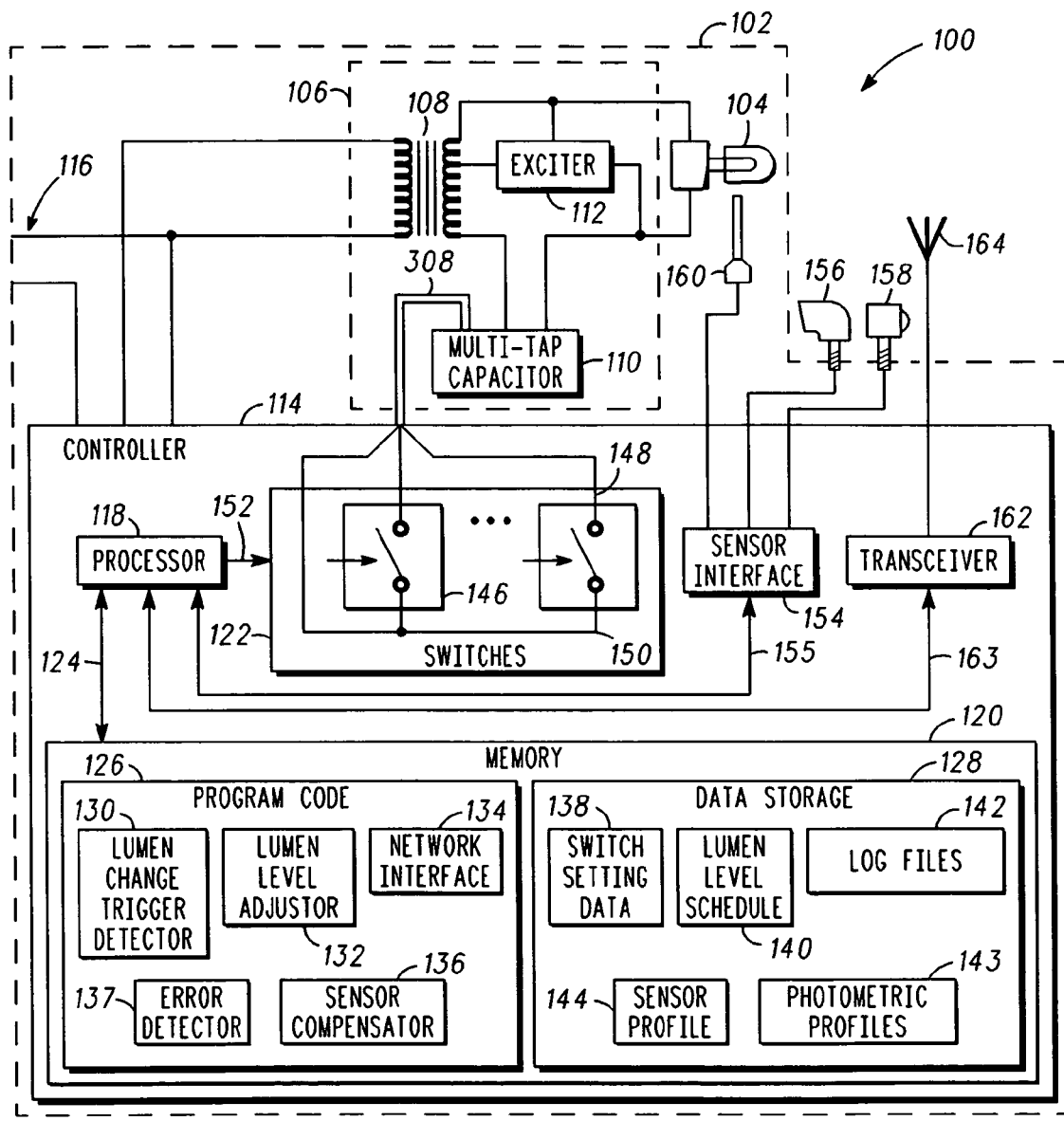
FIG. 1 depicts, in a simplified and representative form, a high-level block diagram of a controller and multi-tap capacitor in a constant wattage isolated (CWI) configuration for is controlling a luminaire in accordance with one or more embodiments.

In overview, the present disclosure concerns controlling lumen output and power consumption of light fixtures, including ballasted HID lamps. More specifically, various inventive concepts and principles embodied in methods and apparatus can be used for controlling, adjusting, compensating, and monitoring operating parameters of a luminaire. The methods and apparatus are particularly suited for ballast circuits that employ a capacitor, such as core and coil transformer ballast arrangements, which can be commonly referred to as is Constant Wattage Autotransformer (CWA) ballasts, and Constant Wattage Isolated (CWI) ballasts.

While the luminaire controller methods and systems of particular interest may vary widely, one embodiment may advantageously be used in an overhead street light, which is commonly used to illuminate roadways, highways, and residential streets. Additionally, the inventive concepts and principles taught herein can be advantageously applied to other lighting systems, particularly where it is advantageous to control the light level output, or lumen level output, of the luminaire, and where it is advantageous to adjust, compensate, and monitor luminaire output and power consumption of a light fixture or lighting system.

The instant disclosure is provided to further explain, in an enabling fashion, the best modes, at the time of the application, of making and using various embodiments in accordance with the present invention. The disclosure is further offered to enhance an understanding and appreciation for the inventive principles and advantages thereof, rather than to limit the invention in any manner. The invention is defined solely by the appended claims, including any amendments made during the pendency of this application, and all equivalents of those claims as issued.

It is further understood that the use of relational terms, if any, such as first and second, top and bottom, and the like, are used solely to distinguish one entity or action from another without necessarily requiring or implying any actual such relationship or order between such entities or actions.

Much of the inventive functionality and many of the inventive principles can be implemented with, or in, integrated circuits (ICs), possibly including application specific ICs, or ICs with integrated processing, which can be controlled by embedded software, firmware, or program code. It is expected that one of ordinary skill—notwithstanding possibly significant effort and many design choices motivated by, for example, available time, current technology, and economic considerations—when guided by the concepts and principles disclosed herein, will be readily capable of generating such software instructions and programs and ICs with minimal experimentation. Therefore, in the interest of brevity and minimizing any risk of obscuring the principles and concepts according to the present invention, further discussion of such software and ICs, if any, will be limited to the essentials is with respect to the principles and concepts of the various embodiments.

Referring now to FIG. 1, there is depicted, in a simplified and representative form, a high-level block diagram of luminaire 100, connected in a constant wattage isolated (CWI) configuration, in accordance with one or more embodiments. Luminaire 100 includes luminaire housing 102 for enclosing and supporting, lamp 104, ballast circuit 106, and controller 114. Lamp 104 can be a high intensity discharge (HID) lamp, such as, for example, a metal halide lamp, a mercury vapor lamp, or a high-pressure sodium lamp. Light is generated in an HID lamp by an arc which is established between two electrodes in a gas-filled tube. The arc causes a metallic vapor to produce a radiant energy.

HID lamps have special electrical requirements that must be supplied by a ballast, such as ballast circuit 106, which is specifically designed for the type of lamp, the ballast and ballast configuration, and the operating wattage. The ballast provides system stability by limiting the current that can be drawn through the HID lamp. Ballasts use inductive and capacitive components because they impede alternating current with little power consumption. Thus, ballast circuit 106 includes transformer 108 (the inductive component) and multi-tap capacitor 110 (the capacitive component). In one embodiment, ballast circuit 106 can be implemented with a 150 watt (W) ballast, such as ballast model # 71A8188 manufactured and sold by Advance Transformer, located in Rosemont, Ill.

Exciter 112, which can also be referred to as an igniter, is a circuit for providing a voltage to break down the gas between the electrodes of lamp 104 and initiate starting. For example, in one embodiment using a 150 W ballast, exciter 112 can be implemented with igniter model # LI551J, manufactured and sold by Advance Transformer, located in Rosemont, Ill.

Multi-tap capacitor 110, which is described more completely below, provides a selectable capacitance value in ballast circuit 106 in order to adjust the intensity of lamp 104, and to control the power consumed by lamp 104, while maintaining the manufacturer's requirements for capacitance in the ballast circuit, and for power within the circuit. The capacitance value of multi-tap capacitor 110 can be selected, or variably controlled, by controller 114, which is coupled to multi-tap capacitor 110 through wire (or wires) 308.

Power for luminaire 100 is received by power wires 116, where, in one embodiment, the power is supplied from a typical alternating current source in a range of 110 volts, alternating current (VAC) to 480 VAC. In the embodiment shown, one of the power supply wires 116 passes through controller 114 so that luminaire 100 can be switched on and off by a switch in controller 114 (not shown).

Controller 114 is used to turn luminaire 100 on and off, and to control the brightness of lamp 104 by selecting one of a plurality of lumen levels between a dimmest mode of operation and a brightest mode of operation, where the lumen level is selected in response to a triggering event.

Controller 114 includes processor 118, which is coupled to memory 120, and a plurality of switches 122. Processor 118 can perform many of the functions and operations that occur within controller 114 by executing program code (e.g., software) and using data stored in memory 120. In one embodiment, processor 118 can include one or more microprocessors, microcontrollers, or digital signal processors, which are each well known and readily available. For example, in one embodiment processor 118 can be implemented with the microcontroller manufactured and sold under part number ATMEGA128L-8A1 by ATMEL Corporation, in San Jose, Calif.

Processor 118 can be coupled to memory 120 through interface 124, which, in one embodiment, is configured to transfer data and program code for processing and execution in processor 118. In some embodiments, processor 118 can also include internal memory, which can be used for storing program code and/or data.

Memory 120 can be implemented using some combination of generally known memory technology, such as RAM, ROM, EPROM, magnetic memory, optical memory, and the like.

Memory 120 can include program code 126 and data storage 128, which can be individually or collectively used to execute various algorithms, processes, and methods within processor 118 and luminaire 100. For example, program code 126 can include program code for processes and algorithms that implement lumen change trigger detector 130, lumen level adjuster 132, network interface 134, sensor compensator 136, and error detector 137.

As will be described in greater detail below, lumen change trigger detector 130 can be used to detect a triggering event, or threshold crossing (e.g., a monitored value exceeding or falling below a predetermined value), or a scheduled time, for changing the lumen output of luminaire 100; lumen level adjuster 132 can be used for adjusting, or fine tuning, a lumen output of lamp 104 so that it more precisely matches the lumen level called for in response to a corresponding trigger; network interface 134 can be used to communicate data and commands with other networked devices; sensor compensator 136 can be used to compensate sensor readings in response to environmental conditions; and error detector 137 can be used to detect and report errors in the operation of luminaire 100.

Data storage 128 can be used to store data related to an operating schedule, data related to operating in response to triggering events, and data logged to record various parameters of operation of luminaire 100. Data storage 128 can include switch setting data 138, lumen level schedule 140, log files 142, and photometric profiles 143, and sensor profile data 144.

As will be described in greater detail below, switch setting data 138 relates to the setting of switches 122 for a particular lumen output level; lumen level schedule 140 is data that relates to scheduling a particular lumen level output for a particular time of day; log files 142 is data that relates to recording parameters of operation; photometric profiles 143 is historical data measurements that characterizes luminaire operation under particular conditions; and sensor profile data 144 is data that relates to characterizing sensor operation under various environmental conditions.

While much of the functionality of controller 114 can, in some embodiments, be attributed to software instructions as executed by processor 118, it will be appreciated that many of these operations can also be performed by hardware, or some combination of software and hardware. Additionally, it will be appreciated by those of ordinary skill that a multiplicity of other functions or operations, which are not specifically shown, can be performed in a typical controller device, and that various of those can be implemented, at least in part, with the processor(s) and various software instructions, etc.

Switches 122 includes a plurality of individual switches, or switching elements, 146, which each have a first switch terminal 148 coupled to one "tap" capacitor (described more completely below) inside the housing of multi-tap capacitor 110. A second switch terminal 150 of each switch 146 is coupled together to a common wire. Switches 122 are coupled to processor 118 by interface 152, which interface can carry data to configure, or selectively open and close switches 148. By selectively opening and closing switches 148 various capacitance values can be produced in multi-tap capacitor 110.

In one embodiment, switches 122 can be electronic switches, which use electrical components instead of moving parts. For example, switches 122 can be implemented with electronic switches sold under part number Q6006DH3 by Teccor of Fort Worth, Tex. Ideally, switches 122 should tolerate to changes in temperature and voltage over time. In an alternative embodiment, other types of switches can be used in place of the electronic switches. For example, relays can be used. Although electronic switches can switch quickly, it should be noted that it will take time for lamp 104 to either heat up or cool down in response to a change of voltage in ballast circuit 106, and until the temperature stabilizes a change in lamp output will not be fully in effect.

Controller 114 can also include sensor interface 154 coupled to processor 118 by data interface 155. Sensor interface 154 can be used to obtain and convert data from various sensors. For example, sensor interface 154 can be coupled to daylight sensor 156, activity sensor 158, and lumen level sensor 160, which are all described in greater detail below. If the sensors output an analog voltage level, sensor interface 154 can be used to convert analog data to digital data, which can then be read and used by processor 118. Additionally, if sensors are nonlinear, sensor interface 154 can be used to normalize sensor readings. If sensor readings tend to vary with ambient temperature, sensor interface 154 can be used to compensate sensor readings in response to the sensor temperature. In other embodiments such normalizing and compensating can be done by processor 118.

Controller 114 can also include transceiver 162 coupled to processor 118 by data interface 163. Transceiver 162 can be coupled to antenna 164 for wirelessly communicating with other network devices, or controllers, or data storage devices. For example, transceiver 162 can be used to receive commands or messages that turn luminaire 100 on, or off, or to a particular lumen level. Transceiver 162 can also be used to receive control data for storing in lumen level schedule 140, or data for storing in switch setting data 138, or other similar data for storing in data storage 128. Transceiver 162 can communicate data wirelessly using radio frequency signals, infrared signals, or other wireless data transmission techniques, or transceiver 162 can communicate data via a wire, such as power wires 116 using power line carrier data transmissions, or other wireline transmission techniques. In some embodiments, transceiver 162 can be separate from controller 114 while still sharing an interface with controller 114, wherein transceiver 162 is not in a common housing with controller 114.

Transceiver 162 can also be used to send data from data storage 128. For example, in one embodiment, data such as log files 142, which can represent a time of operation at a particular lumen level and power consumption level, can be sent from data storage 128. Data regarding times and power consumption levels can be used for more accurate billing because data representing electricity actually used can be recorded by luminaire 100. Data in log files 142 that indicates a problem or erroneous operation can also be sent by transceiver 162.

Figure 2:
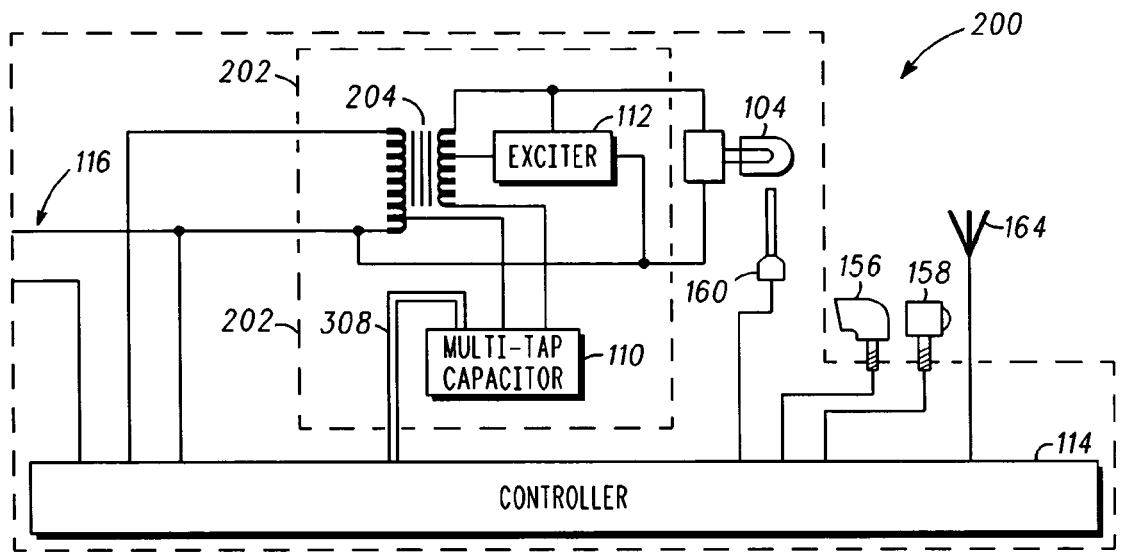
FIG. 2 illustrates, in a simplified and representative form, the controller and multi-tap capacitor of FIG. 1 in a constant wattage autotransformer (CWA) configuration for controlling a luminaire in accordance with one or more embodiments.

With reference now to FIG. 2, there is depicted, in a simplified and representative form, a high-level block diagram of luminaire 200, which is similar to luminaire 100 except that it is connected in a constant wattage autotransformer (CWA)

configuration, in accordance with one or more embodiments. As shown, luminaire 200 includes housing 102 for enclosing and supporting lamp 104, ballast 202, and controller 114. Note that ballast 202 is connected in a CWA configuration using auto transformer 204. Multi-tap capacitor 110 is in a series circuit with a secondary side of transformer 202, and with lamp 104. As described above with referenced FIG. 1, day light sensor 156, activity sensor 158, and lumen level sensor 160 are each coupled to controller 114. Antenna 164 may also be coupled to controller 114 for receiving or transmitting data.

Because the primary side of the ballast is not completely isolated from the secondary side in the CWA configuration, the CWI configuration of FIG. 1 is preferred in some areas (e.g., cities, states, or countries).

Figure 3:
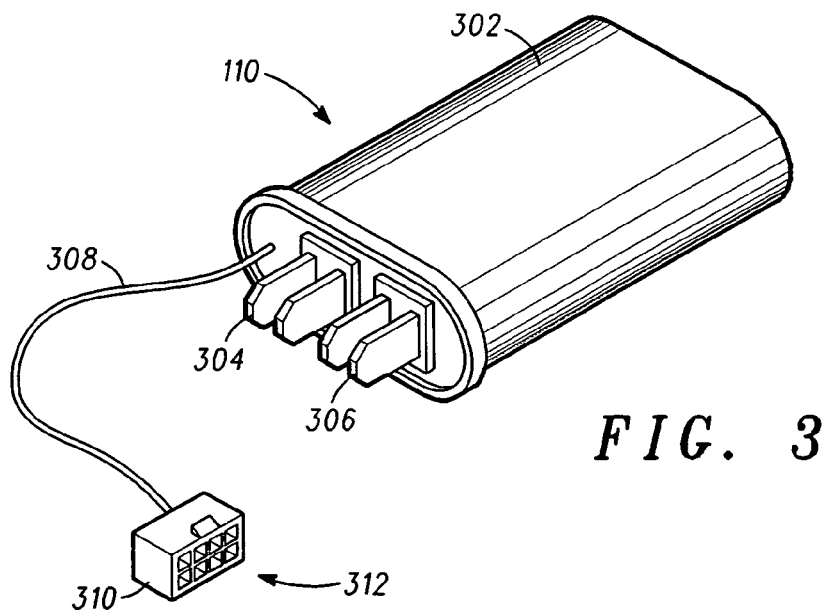
FIG. 3 is a perspective view of a multi-tap capacitor in accordance with one or more embodiments.
Figures 4, 6:
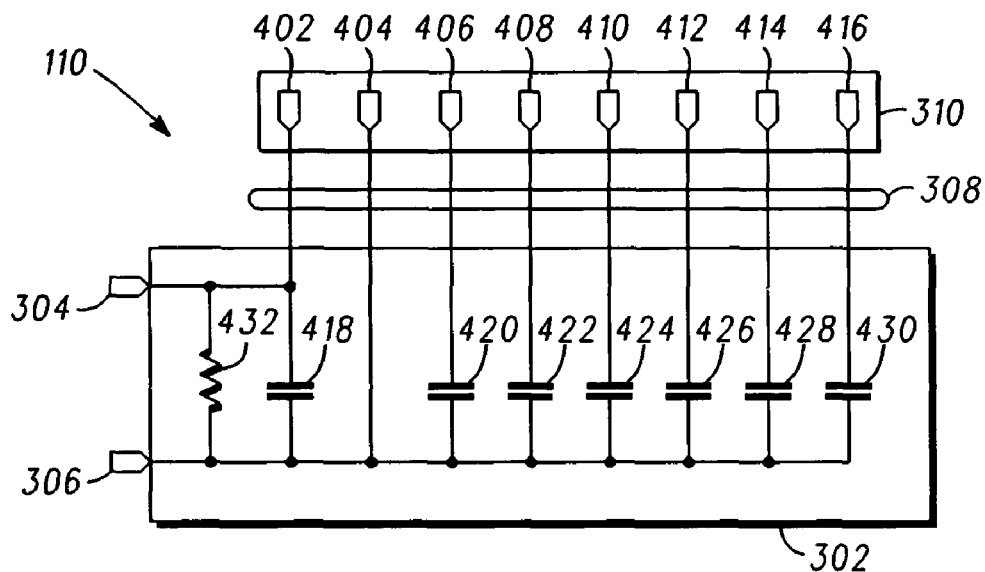
FIG. 4 depicts a schematic circuit diagram of the multi-tap capacitor of FIG. 3 in accordance with one or more embodiments.
FIG. 6 illustrates switch setting data that can be used by luminaire 100 of FIG. 1 in accordance with one or more embodiments.

Turning now to FIG. 3, there is depicted a perspective view of multi-tap capacitor 110, which is also shown in FIGS. 1 and 2, and in schematic form in FIG. 4. As illustrated, multi-tap capacitor 110 has a housing 302 and connector lugs 304 and 306. Connector lugs 304 and 306 are supported by housing 302, and they are selectably connectable by controller 114 to a plurality of capacitors inside housing 302, which capacitors are described more completely with reference to FIG. 4, below. Connector lugs 304 and 306 are accessible from the exterior of housing 302, and are configured to receive spade connectors that are attached to wires, which are coupled to either lamp 104, or transformer 108 or 202, or other components in the ballast circuit in order to place multi-tap capacitor in the ballast circuit.

Multi-tap capacitor 110 can also include wire 308 that passes through housing 302. Connector 310 is located at one end of wire 308 for connecting to controller 114. The other end of wire 308 is connected internally to one or more capacitors, as described more completely below with reference to FIG. 4. In one embodiment, connector 310 includes a plurality of connector pins 312, wherein each pin is located inside one of the openings in connector 310. Wire 308 together with connector 310 may be referred to as a wiring harness. This wiring harness can connect to a plug on controller 114, or it can connect to another complimentary wiring harness coupled to controller 114.

The size and shape of multi-tap capacitor 110, and connector lugs 304 and 306, are selected so that multi-tap capacitor 110 can easily replace a capacitor typically used in a luminaire. Such capacitor replacement can be part of retrofitting a conventional, non-adjustable luminaire with multi-tap capacitor 110 and controller 114 in order to create a luminaire that can be monitored and controlled, in terms of brightness and power consumption, in a manner similar to that of luminaire 100.

Referring now to FIG. 4, there is depicted a schematic circuit diagram of multi-tap capacitor 110 (see FIGS. 1, 2, and 3) in accordance with one or more embodiments. As shown, multi-tap capacitor includes housing 302, which, in a preferred embodiment, is a can made of metal or some other durable and resilient material. The shape, size, and material of housing 302 are, in one embodiment, typical of capacitors used in HID ballast circuits.

Coupled to housing 302 are terminals 304 and 306 for connecting to the multi-tap capacitance within housing 302. In one embodiment, terminals 304 and 306 can be connector lugs, which are commonly used on capacitors in HID ballast circuits.

Inside housing 302 there is a plurality of capacitors, wherein each capacitor is, in a preferred embodiment, coupled via wires 308 to a connector pin (e.g., 402, 404, 406, 408, 410, 412, 414, and 416) in multi-pin connector 310. In a preferred embodiment, multi-tap capacitor 110 includes base capacitor 418 integrated with a plurality of tap capacitors 420, 422, 424, 426, 428, and 430. In other embodiments, multi-tap capacitor 110 can have a plurality of tap capacitors that can be selectively connected in parallel across lugs 304 and 306, but without a base capacitor permanently connected across lugs 304 and 306. Multi-tap capacitor 110 can also include resistor 432 connected in parallel with base capacitor 418 to discharge base capacitor 418 so that it will not hold a charge and become a shock hazard.

The ballast type (i.e., CWA, CWI) and the lamp wattage are variables that determine the capacitance values within multi-tap capacitor 110 in ballast circuit 106 and 202. Thus, the capacitor values within multi-tap capacitor 110 depend upon the manufacturer of ballast transformer (e.g., 108 and 204) and lamp 104, and the rated wattages of each. Lamp manufacturers typically provide inductance and capacitance values and other parameters for selecting ballast circuit components. One of the parameters specified is the total capacitance required for full brightness, or full power, operation of the ballast circuit.

The capacitance value of base capacitor 418 (which can be noted as $C_{base}$) is preferably selected to operate luminaire 100 in a minimum brightness mode, which mode consumes the least power (e.g., typically about 50% of rated maximum power, depending upon the lamp manufacturer), and outputs the lowest lumen level. In order to determine the capacitance value for operating at 50% power, or minimum brightness, the ballast type and wattage is noted, and the ballast capacitor value is determined by reading tables on the manufacturer's datasheet. An example of data found in a manufacturer's datasheet is shown in Table 1, below:

TABLE 1

Example Data Sheet from Ballast Manufacturer

| Ballast Type | Lamp Wattage (Watts) | Total Capacitance Required (µF) |
|---|---|---|
| CWA | 150 | 55 |
| CWA | 250 | 35 |
| CWA | 400 | 55 |
| CWI | 150 | 52 |
| CWI | 250 | 28 |

The capacitance value needed to operate luminaire 100 in a maximum brightness mode (which value can be noted as $C_{max}$) can be used to select the capacitance values of tap capacitors 420, 422, 424, 426, 428, and 430. For example, a capacitance value that can be added to base capacitance 418 to operate luminaire 100 in a maximum brightness mode specified by the manufacturer (which value can be noted as $C_{tap\_tot}$) is equal to the value of all tap capacitors added in parallel. The difference between $C_{base}$ and $C_{tap\_tot}$ is the amount of capacitance available to use as multilevel power control, and is the magnitude of the range of variance of capacitor values in multi-tap capacitor 110. The difference between $C_{max}$ and $C_{base}$ is $C_{tap\_tot}$.

If there are (t) number of tap capacitors, then each tap capacitor can have a value ($C_x$) determined by the formula:

$$C_x = \frac{C_{tap\_tot}(2^{t-x})}{2^t - 1}$$

where

-continued $x = 1$ to $t$.

The number of tap capacitors t can be determined by the desired number of lumen adjustment levels, or the desired number of equally distributed steps in multi-tap capacitance value between $C_{base}$ and $C_{max}$. For example, if ($\alpha$) number of adjustment levels are desired, then the number of tap capacitors, t, can be computed by the formula:

$t = \log_2 \alpha$

For example, if 64 levels of adjustment are desired (e.g., $\alpha. = 64$), the number of tap capacitors t is equal to 6, as shown by the equation:

$t = \log_2 64 = 6$

Table 2 below shows examples of base 418 and tap capacitor (420, 422, 424, 426, 428, and 430) values that can be used to provide 64 selectable values of multi-tap capacitor 110 ranging from $C_{base}$ to $C_{max}$. The examples are for different ballast types (e.g. CWA and CWI), and different lamp wattages. As can be seen, multi-tap capacitor 110 is preferably designed based upon the ballast type and the manufacturer's recommended minimum (e.g., $C_{base}$) and maximum (e.g., $C_{max}$) capacitance values for safely operating lamp 104.

TABLE 2

Base and Tap Capacitor Values for different wattages and ballast types

| Ballast Type | Lamp Wattage (Watts) | Total Capacitance Required $C_{max}$ (μF) | Base Capacitor value $C_{base}$ (μF) | $C_{tap\_tot}$ (μF) | $C_1$ | $C_2$ | $C_3$ | $C_4$ | $C_5$ | $C_6$ |
|---|---|---|---|---|---|---|---|---|---|---|
| CWA | 150 | 55 | 40 | 15 | 7.62 | 3.81 | 1.9 | 0.95 | 0.48 | 0.24 |
| CWA | 250 | 35 | 28 | 7 | 3.56 | 1.78 | 0.89 | 0.44 | 0.22 | 0.11 |
| CWA | 400 | 55 | 40 | 15 | 7.62 | 3.81 | 1.9 | 0.95 | 0.48 | 0.24 |
| CWI | 150 | 52 | 40 | 12 | 6.1 | 3.05 | 1.52 | 0.76 | 0.38 | 0.19 |
| CWI | 250 | 28 | 21 | 7 | 3.56 | 1.78 | 0.89 | 0.44 | 0.22 | 0.11 |

Note that in one embodiment the values of the tap capacitors form a geometric progression with a common ratio of ½. These tap capacitors can be switched in sequential combinations, similar to a sequence of binary numbers, to produce a near-continuously varying capacitance from a lowest value, equal to base capacitance 418 (e.g., $C_{base}$), to the highest value, equal to the base capacitance plus $C_{tap\_tot}$ (i.e., all tap capacitors added in parallel), where a resolution of such varying capacitance is equal to the smallest tap capacitance value.

In one embodiment, base capacitor 418 is permanently connected across terminal lugs 304 and 306 so that the minimum multi-tap capacitance appearing across lugs 304 and 306 is the base capacitance value, which is the minimum value for lamp 104 operation. This prevents luminaire 100 from losing an arc and having to restart.

Figure 5:
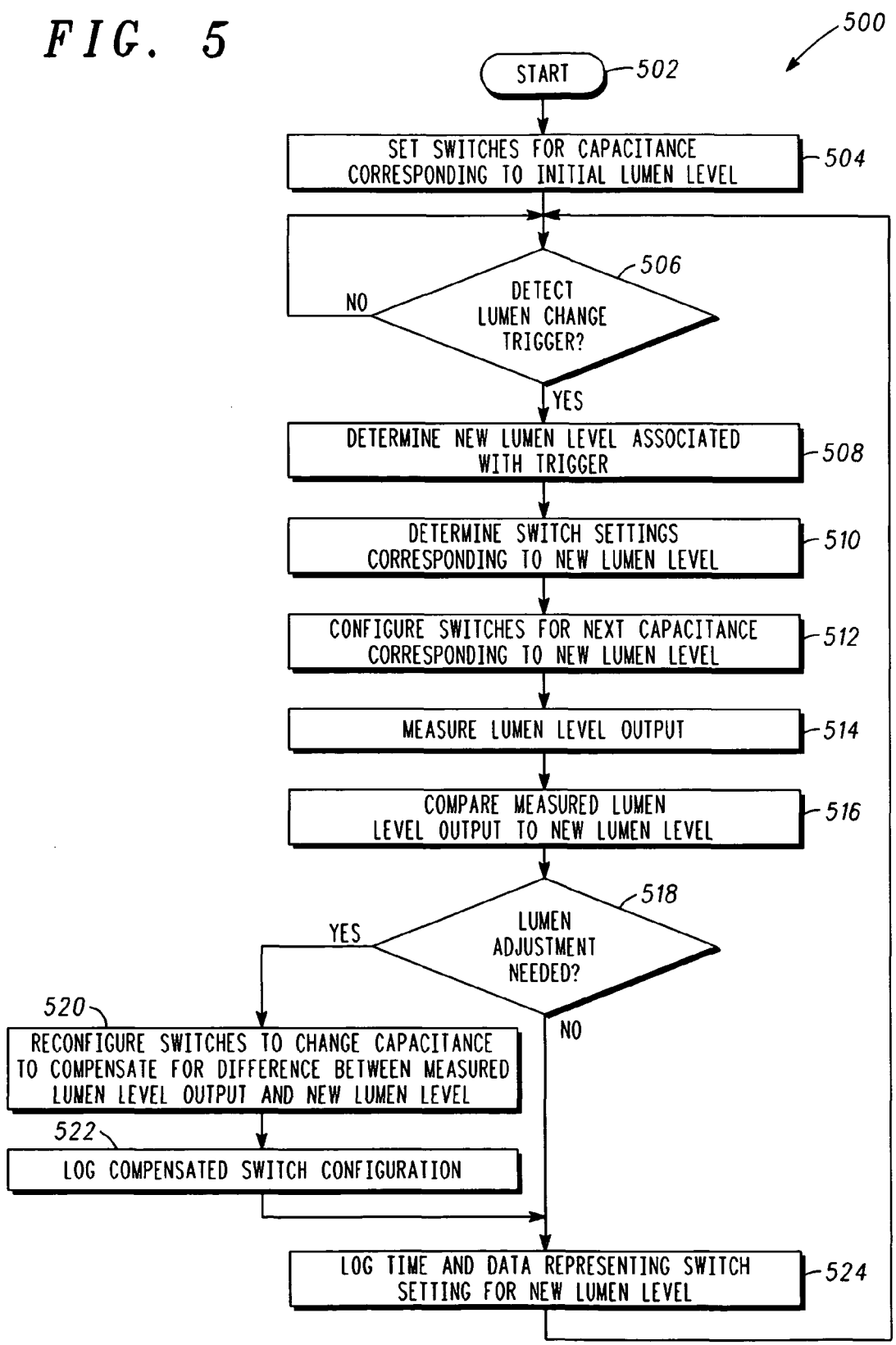
FIG. 5 is a high-level flowchart of processes executed by a controller that can be used in conjunction with the FIG. 1 luminaire control system in accordance with one or more embodiments.

Turning now to the operation of luminaire 100 (or 200), FIG. 5 depicts a high-level flowchart 500 having exemplary processes executed by a luminaire and luminaire controller, such as luminaire 100 luminaire controller 114, or executed by another similar apparatus, in accordance with one or more embodiments. As illustrated, the process begins at 502, and thereafter passes to 504 wherein the process sets switches to produce a capacitance in a multi-tap capacitor that corresponds to an initial lumen level. The initial lumen level can be, for example, turning luminaire 100 from off to on with at a specified lumen level. In one embodiment, setting the switches can be implemented with processor 118 coupled to switches 122 through interface 152, as shown in FIG. 1. Processor 118 can send digital control signals to solid state electronic switches to selectively put switches 146 into an open circuit state (e.g., high impedance state) or a closed circuit state (e.g., conductive state). As switches 146 are set to the conductive state they connect corresponding tap capacitors in parallel wherein the values of the tap capacitors are added together to produce the multi-tap capacitance, which can be measured across terminals 304 and 306

Next, the process determines whether a lumen change trigger has occurred, as shown at block 506. A lumen change trigger is a predetermined condition that initiates a change in lumen output of the luminaire that is needed or desired. For example, a lumen change trigger can be a time of day, which is recorded in a schedule, such as lumen level schedule 140, or another similar table or database. In another embodiment, a lumen change trigger can be detecting an activity level that crosses above or below a threshold. Such an activity level can be detected by a sensor measuring pedestrian or vehicle traffic along a roadway or at an intersection. Activity levels can be measured or sensed with sensor 158, which sensor can be an infrared, radar, or sonar motion detector, a street crosswalk button, a vehicle sensor in the pavement of the roadway, a camera adapted to detect vehicles or person, or the like.

Another lumen change trigger can be a particular weather condition, such as rain, snow, fog, or other weather condition in which an increased or decreased level of light is useful or desired. Environmental or weather conditions can effect the apparent illumination from luminaires. During fog, rain, or snow, it is often desirable to increase the illumination from the overhead luminaires in order to improve visibility at ground level.

In another embodiment, a lumen level change trigger can be a message or command received by transceiver 160, or another similar data receiver. Such a message can be a command to turn on or turn off, or a command to change to a particular lumen output level. Such commands can be received from a central controller either directly or through a network. Commands can be received as a relayed message from another luminaire 100, wherein such luminaires work together as part of a mesh data communication network, where messages are relayed from luminaire to luminaire. Transceiver 160 can be any one of various known data receivers (or transceivers if transmission from luminaire 100 is needed), such as, for example, a radio frequency receiver, an infrared data receiver, a light pulse receiver, or the like.

Other embodiments can receive a lumen level trigger from signals transmitted from an emergency vehicle. For example, the signal on an emergency vehicle that turns intersection lights green for ambulances and fire trucks (e.g., a strobe light set to flash at a predetermined frequency, which can be received by a light pulse receiver) can also be used as a lumen level trigger suitable for a high speed response to an emergency. Other emergency signals can also be a lumen level trigger. For example, a building alarm can send out a message or signal that can be received by luminaire 100. In response to such an alarm, luminaire 100 can be triggered to increase lumen output to a maximum lumen level, which can help emergency personnel handle the situation that caused the alarm.

In yet another embodiment, a lumen level trigger can be a command sent, perhaps from a power company, instructing devices to shed or reduce an electrical load in order to ease the demand for power. For example, in response to demand for electricity exceeding a threshold, the power company can send a signal that requests selected devices to reduce their demand for power, and enter an energy saving mode. When luminaire 100 receives such a request, it can reduce the lumen output to reduce electricity consumption.

Figure 8:
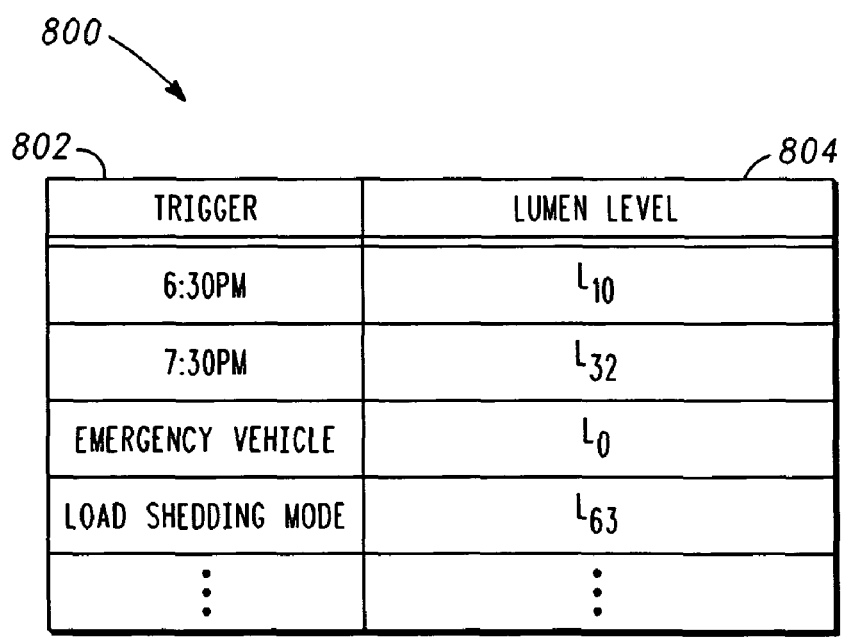
FIG. 8 depicts a lumen level schedule in accordance with one or more embodiments.

FIG. 8 depicts an example of a lumen level schedule 140 in the form of a table 800 that contains trigger events 802 and corresponding lumen levels 804. As discussed above, trigger events 802 can be a time of day, or the presence of an emergency vehicle (e.g., the detection of a signal from an emergency vehicle), or the reception of a load shedding command, or the like. Associated with these trigger events 802 is a lumen level 804, which is a light output level that is selected or scheduled to be output by luminaire 100 when the trigger event occurs. In one embodiment, there can be several tables or schedules similar to table 800, wherein each schedule runs under particular circumstances. For example, one table 800 can be for weekdays, while another table is for weekends. There can be schedules for special events, and there can be schedules for different parts of the year.

After detecting the lumen level trigger, the process determines a new lumen level in response to the detected trigger, as shown at 508. In one embodiment, the process can look up a new lumen level in a schedule or data table (e.g., table 800 in FIG. 8), wherein the new lumen level 804 corresponds to the detected trigger 802. For example, in one embodiment, lumen change trigger detector 130 can detect a time of day having a scheduled lumen change, and in response to the time of day, the process can look up a new lumen level in schedule 800 that is associated with the detected time of day.

After looking up new lumen level, the process determines switch settings that correspond to the new lumen level, as illustrated at 510. The switch settings are for configuring switches 148 to produce a multi-tap capacitance in multi-tap capacitor 110 having a value selected to operate luminaire 100 at the new lumen output. In one embodiment, the maximum multi-tap capacitance can be produced in multi-tap capacitor 110 by setting all switches 146 to the conductive state, thereby connecting all tap capacitors (420, 422, 424, 426, 428, and 430) in parallel with base capacitor 418. A minimum multi-tap capacitance can be produced by setting all switches 146 to the open circuit state. Various other lumen output levels can be set by using other combinations of opened and closed switches. With the embodiment of multi-tap capacitor 110 shown in FIG. 4, which has six tap capacitors, 64 different multi-tap capacitances can be produced using all possible open and closed settings for the 6 corresponding switches 148 in controller 114.

Next, the process configures the switches to produce the multi-tap capacitance value in the multi-tap capacitor, where the multi-tap capacitance value corresponds to the new lumen level, as illustrated at 512. In one embodiment, this can be implemented by sending signals from processor 118 to switches 122 via interface 152, wherein the signals control individual switches 146, selectively placing them in the open circuit or closed circuit state to create parallel connections of selected tap capacitors (420, 422, 424, 426, 428, and 430) connected in parallel with base capacitor 418 within multi-tap capacitor 110. Thus, in response to the controller's selection or enabling commands, secondary voltage is output from multi-tap capacitor 110 to the ballast circuit.

After configuring the switches to produce the next capacitance value in multi-tap capacitor 110, the process measures a lumen level output by lamp 104, as depicted at 514. In one embodiment, this step is implemented by reading from sensor interface 154 a value output by lumen level sensor 160.

In some embodiments, the accuracy of lumen level sensor 160 can be improved if is the process also reads the current operating conditions that can affect the output of lumen level sensor 160, such as the temperature of lumen level sensor 160. Then the process can compensate for the affects of temperature and other operating conditions by referring to tables of data or equations, and applying appropriate compensation factors to correct or compensate the reading from lumen level sensor 160. In one embodiment, lumen level sensor 160 can have a portion of the sensor (i.e., a portion integral to the sensor) that measures the temperature of the lumen sensor so that the lumen sensor output can be compensated using sensor profile data 144 that describes the operation of the sensor over various environmental conditions.

After measuring the lumen level output, the process compares the measured lumen level output to the new lumen level, as depicted at 516. This comparison produces an error value, or a difference, between the measured lumen level and the new lumen level.

One reason for comparing the measured lumen level output to the new lumen level value is that reducing the system input power may not proportionally reduce the lumen output. Therefore, when a lamp is adjusted, the reduction in lumen output can be greater than the reduction in the system input power, which means that the efficiency can decrease as the lamp is adjusted.

Because HID lamps may not immediately adjust the light output when the multi-tap capacitance value is changed, in some embodiments there can be a delay between configuring the switches in 512 and measuring the lumen level output in 514. When some systems are dimmed from full power to minimum power, approximately half of the total change in the light output occurs within the first few seconds. Then it can take from 3 to 10 additional minutes for the light to stabilize. In other instances, depending upon the characteristics of the particular ballast-lamp combination, the lamps can respond instantly to small changes in input power.

Some manufacturers claim that operating a halide or mercury vapor lamp in a dimmed mode can actually increase the lamp lumen depreciation of metal, which in turn produces undesirable optical effects, such as flickering or distortions. A reduction of power to these types of lamps causes the arc tube to blacken due to electrode sputtering, which can change the lumen output over time. To help limit this effect, lamp manufacturers recommend that such lamps not be dimmed below 50% of rated power. Thus, in general, a 50% power level must be maintained within the ballast-lamp circuit to provide satisfactory lamp operation.

After determining the difference between the measured lumen level output and the new lumen level, the process determines whether a lumen adjustment is necessary, as shown at 518. A lumen level adjustment can be necessary if the difference exceeds a predetermined value.

If the lumen adjustment is necessary, the process passes to block 520, where the process reconfigures the switches to change the multi-tap capacitance to compensate for the difference between the measured lumen level output and the new lumen level. In one embodiment, this step can be implemented by changing the switch settings to either raise or lower the multi-tap capacitance to reduce the error value. This step provides feedback to controller 114 so that controller 114 can more accurately control the lumen level output of luminaire 100. Such feedback is needed because over time, the correlation of multi-tap capacitor values (selected by particular switch settings) to lumen output levels can drift as lamp 104 ages (e.g., as the inside of the lamp darkens with the byproducts of arcing), or as temperature effects the operation of luminaire 100.

After reconfiguring the switches, the process logs the compensated switch configuration, as shown at 522. In one embodiment, this step can be implemented by changing switch setting data 138 (see FIG. 1) in a table or database that corresponds to the new lumen level. By changing the data in switch setting data 138, luminaire 100 remains accurate for each lumen level called for, or indicated by, the corresponding lumen change trigger. Thus, luminaire 100 will not put out more light than needed, thereby wasting energy, nor will it put out less light than needed, causing unsafe conditions or difficulties in seeing.

Briefly referring to FIG. 6, table 600 shows an example of data that can be stored in switch setting data 138 in FIG. 1. As illustrated, column 602 lists all possible lumen levels that can be output by luminaire 100. Such lumen levels can be listed in foot candle units, or ADC values measured by a lamp sensor during a luminance characterization process specific to this particular ballast, igniter, and lamp combination. Column 604 can list dimming levels that correspond to the lumen levels in 602. Data representing switch settings can be stored in column 606. In the embodiment shown, switch settings 606 are stored as Boolean data that corresponds to conducting (e.g., on) and non-conducting (e.g., off) switch elements 146. Switch settings 606 can be the original switch settings programmed into luminaire 100. After switch settings have been adjusted to compensate for the difference between the measured lumen level output and the new lumen level, adjusted switch settings can be stored in column 608 so that the next time luminaire 100 is set to a particular lumen level 602, the adjusted switch setting 608 can be used with the expectation that it is more accurate.

Referring back to FIG. 5, after the compensated switch setting is logged at 522, the process logs the time and data that represents the switch settings for the new lumen level, as illustrated at 524. In one embodiment, this process can be implemented by recording the time and the switch setting in log files 142. Note that the time and switch setting data can be used to calculate the energy used by luminaire 100, if there is additional data available to correlate switch settings to a rate of power consumption. This power usage calculation can be done by a central system control computer using data collected from log file 142 in one or more networked luminaires 100. Thus, data stored in the log files 142 can be used to bill the owner of luminaire 100 for electricity that is actually used rather than guessing the amount of the electric bill based upon the number of luminaires. Because luminaire 100 can record data related to its energy consumption, there is a monetary incentive to install such power control systems, in addition to the fact that energy is saved.

Figure 7:
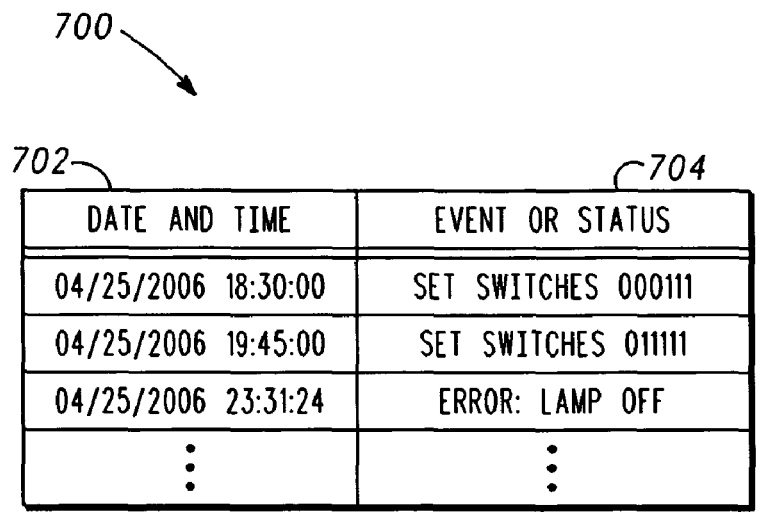
FIG. 7 depicts a log file stored in luminaire 100 of FIG. 1 in accordance with one or more embodiments.

An example of a log file 142 is shown in FIG. 7. As shown, table 700 includes column 702 for storing a time and date. The date can be represented as a month, day, and year. The time can be represented according to a 24 hour clock, with hours, minutes, and seconds. If controller 114 is expected to record invents that can take place in less than a second, then the time can include fractions of a second as necessary. Table 700 also includes column 704 for storing a description of the event or status condition being logged. Examples of events or status that can be logged are: setting switches in response to a particular triggering event, the compensation of switch settings for a particular lumen level, an error conditions such as a lamp failure, lamp cycling, and other similar events and status.

Portions of the above described functions and structures can be implemented in one or more integrated circuits. For example, many of the functions can be implemented in the signal and data processing circuitry that is suggested by the block diagram shown in FIG. 1. The program code suggested by the algorithm and processes of the flowchart of FIG. 5 can be stored in program code 126, which is shown in FIG. 1.

The processes, apparatus, and systems, discussed above, and the inventive principles thereof are intended to produce an improved, more efficient, and more reliable luminaire. In general, the power and brightness of a luminaire can be controlled by a power control circuit that uses an integrated multiple-tap capacitor, under the direction of a controller. The multi-tap capacitor can be substituted for a conventional ballast capacitor in a conventional ballast circuit of a luminaire fixture. Furthermore, such processes, apparatus, and systems, discussed above, are suitable for use in conjunction with digital or electronic ballasts for HID luminaires.

In order to take full advantage of the features and capabilities of luminaire 100, luminaire 100 can be an integral part of a larger system for monitoring and controlling large lighting systems (e.g., municipal lighting systems) that extend over many square miles and include many thousands of luminaires. Such lighting management systems can send operating control data to the thousands of luminaires to individually control the luminaire according to a customized schedule. The lighting management system can also collect data representing power consumed by each of the thousands of luminaires, thereby saving electricity, and collecting accounting data that can provide the basis for reduced electrical billing.

An important aspect of the lighting management system is the creation and use of an accurate database that characterizes the lumen output levels for each of the selectable multi-tap capacitor 110 values when the multi-tap capacitor is combined in luminaire 100 with a particular ballast 108, having a ballast type (e.g., CWI 106, or CWA 202), a ballast wattage, and in combination with a particular lamp, that is manufactured by a particular company, and uses a particular technology (e.g., HPS, MV), in a particular wattage. The database generally includes power consumption and lumen output measurements for all selectable multi-tap capacitor 110 values for all practical combinations of each major component in the lamp circuit.

Figures 9, 11:
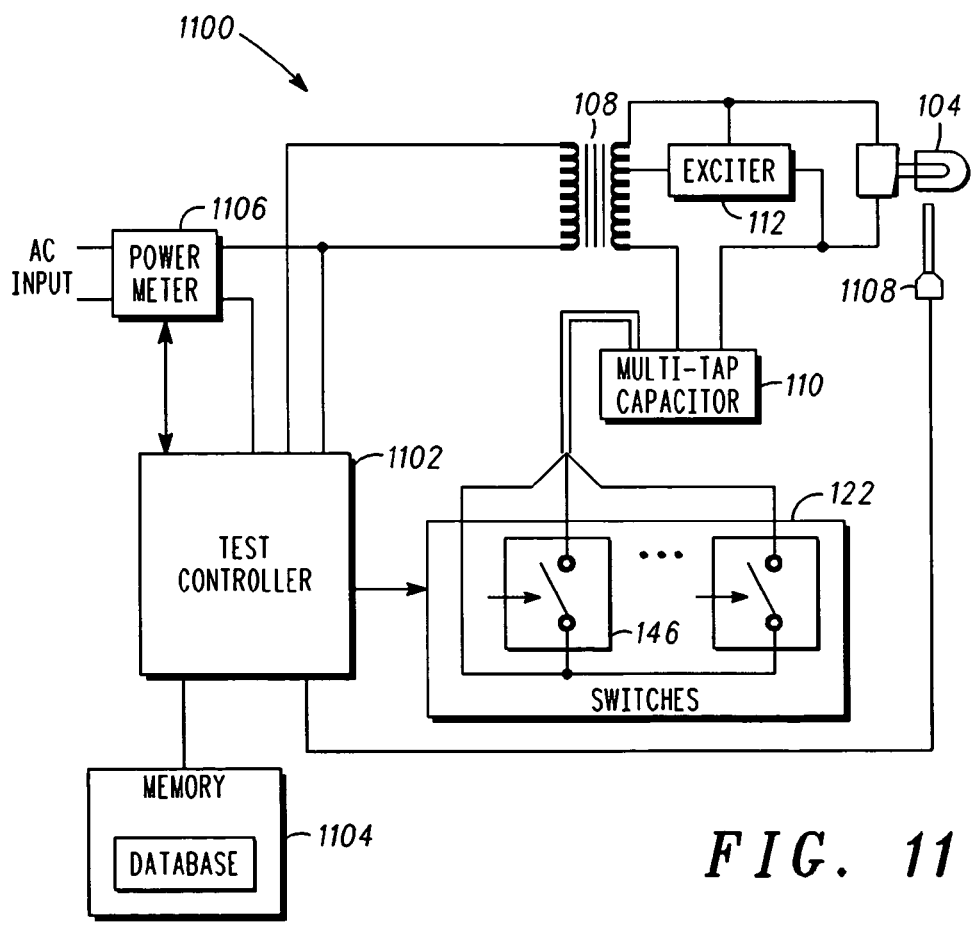
FIG. 9 illustrates a portion of a database containing luminance characterization profiles in accordance with one or more embodiments.
FIG. 11 shows a test station for creating a luminance characterization profile in accordance with one or more embodiments.

Referring now to FIG. 9, there is depicted a portion of a database containing luminance characterization profiles in accordance with one or more embodiments. Luminance characterization profile 900 includes data related to the testing of multi-tap capacitor 110 using a particular ballast and lamp combination. As shown, luminance characterization profile 900 includes a plurality of columns of data, which can include time data 902 that shows the time that the measurements were made.

Column 904 (e.g., another field in the database) can contain luminance measurements of the output of lamp 104 when multi-tap capacitor 110 is set for a corresponding dimming level 906. Each dimming level corresponds to operating lamp 104 with a selected ballast capacitance formed by a set of tap capacitors (420, 422, 424, 426, 428, and 430) connected in parallel with base capacitor 418. Luminance measurements 904 can be made with a photometer, such as photometer 1108, which is discussed below with reference to FIG. 11.

Column 908 includes measurements of real power, measurement in kilowatts. Column 910 includes power factor measurements. The measurements in columns 908 and 910 can be made with a power meter, such as power meter 1106, which is discussed below with reference to FIG. 11.

Turning briefly now to FIG. 11, there is depicted test station 1100 for creating a luminance characterization profile 900 in accordance with one or more embodiments. As shown, test station 1100 can include test controller 1102, which is coupled to memory 1104, power meter 1106, and photometer 1108. Multi-tap capacitor 110 is coupled to lamp 104 and ballast transformer 108, which, in this example, is configured as a CWI ballast.

Test controller 1102 can be implemented with a suitably programmed personal computer having appropriate interfaces for controlling and communicating with power meter 1106 and photometer 1108. In one embodiment, memory 1104 can be contained within the "personal computer" test controller 1102. Interfaces with power meter 1106 and photometer 1108 can be conventional computer data networking interfaces, such as IEEE 488, which is known as the Hewlett-Packard Instrument Bus (HP-IB), which is commonly used for connecting electronic test and measurement devices to controllers such as computers.

In another embodiment, test controller 1102 can be controller 114 in luminaire 100 that is operating in a specially programmed mode, or in a mode where it can be externally controlled by a personal computer to conduct luminance characterization profiles. Thus, when test controller 1102 is implemented with controller 114, switches 122 can be the switches in controller 114. With the "personal computer" test controller 1102, switches 122 can be relays, manually controlled switches, or solid-state electronic switching devices.

In one embodiment, power meter 1106 can be an ION® 7300 power meter from Power Measurement based in Saanichton, BC Canada. Power meter 1106 can measure real and imaginary parts of the power supplied to ballast transformer 108, so that measurements from power meter 1106 can include a real power measurement in kilowatts 908, and a power factor measurement 910 in degrees.

Figure 10:
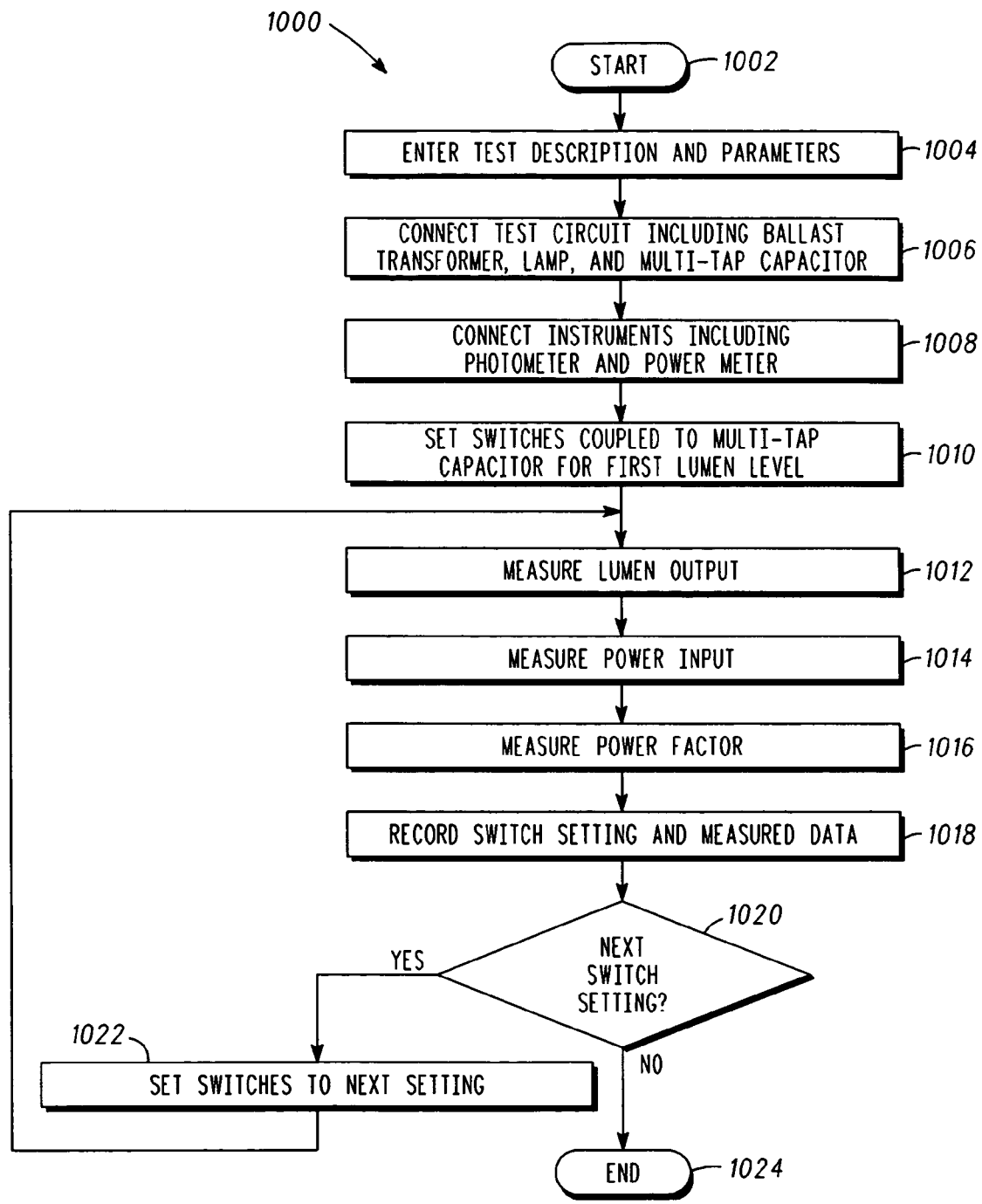
FIG. 10 depicts a high-level flowchart of a process of creating a luminance characterization profile in accordance with one or more embodiments.

With reference now to FIG. 10, there is depicted a high-level flowchart of the process of creating a luminance characterization profile 900 in accordance with one or more embodiments. As illustrated, the process begins at 1002, and thereafter passes to 1004 wherein the process enters test description data, component description data, and parameter data to properly document the luminance characterization profile, so that it may be later recalled and used to develop lumen level schedules having switch configurations that accurately produce a lumen level output.

Next, the test circuit is connected, including connecting a ballast transformer, a lamp, and a multi-tap capacitor in the configuration shown in FIG. 11. As shown in FIG. 11, multi-tap capacitor 110 is connected in series with lamp 104, and in series with a secondary side of ballast transformer 108, which is substantially similar to the circuit shown and described with reference to FIG. 1 where luminaire 100 has a CWI ballast configuration. Exciter 112 is also connected as shown in order to start lamp 104. Note that the test circuit connected at 1006 can be connected in either the CWA ballast configuration 106, or the CWI ballast configuration 202, depending upon which luminaire characterization profile 900 is being created.

After connecting the test circuit, instruments are connected to the test circuit, including a photometer and a power meter, as illustrated at 1008. FIG. 11 shows that photometer 1108 is placed near lamp 104 in order to measure the luminance output in foot-candles. In one embodiment, the photometer and the lamp can be located in a controlled optical chamber. FIG. 11 also shows that power meter 1106 is connected at the alternating current input to ballast transformer 108.

At 1010 the process sets the switches coupled to multi-tap capacitor for the first lumen level that will be measured. Thereafter, the process measures the luminaire output 904, which can be in units of foot-candles, as depicted at 1012. At 1014, the power input is measured (e.g., read from power meter 1106), with real power 908 measured in kilowatts, and a power factor 910 in degrees.

After reading the measurements, the process records the time, switch setting (e.g., the dimming level 906), and the measured data 904, 908, and 910 in a record of luminaire characterization profile 900.

After recording the record, the process determines whether there is a next multi-tap capacitor switch setting that puts multi-tap capacitor 110 in a configuration that has not been tested, as illustrated at 1020. If there are switch settings that have not been tested, the process sets the switches to the next setting, as depicted at 1022. Thereafter, the process iteratively returns to 1012 to continue testing.

If, at 1020, all the switch settings have been tested, the process of creating luminaire characterization profile 900 is finished, and the process ends, as shown at 1024. Note that the process depicted in FIG. 10 will be repeated many times in order to characterize the many combinations of lamps, ballasts, etc.

The pseudo code listed below is an example of the number of times the process of FIG. 10 will be repeated to characterize the many combinations of components that can be used in luminaire 100. Note that there are a number of different parameters that can be used in collecting luminaire characterization profiles to create a database that includes a number of luminaire characterization profiles 900 according to the process depicted in FIG. 10, or another similar process. The pseudo code listed below represents iterative, nested loops that each execute the process depicted in FIG. 10.

```
For each BALLAST MANUFACTURER
    For each MODEL OF BALLAST
        For each BALLAST TYPE
            For each BALLAST WATTAGE
                For each LAMP MANUFACTURER
                    For each LAMP TYPE (eg HPS, MV)
                        For each LAMP MODEL
                            For each LAMP FILAMENT TYPE
                            (e.g. single or dual)
                                For each LAMP WATTAGE
                                    Collect luminance characterization
                                    profile ( see FIG. 10).
                                Endfor
                            Endfor
                        Endfor
                    Endfor
                Endfor
            Endfor
        Endfor
    Endfor
Endfor
```

Thus, the process depicted in FIG. 10 can be repeated many times as represented by all the "nested loops" above in order to develop the database that will help lighting designers incorporate a controlled multi-tap capacitor 110 into a luminaire in order to adjust the brightness of the luminaire to save energy and money. The process depicted in FIG. 10 can be executed by an independent certification lab to verify that the multi-tap capacitor design produces the stated output values, and to produce a luminance characterization profile that lighting engineers can use to prepare lighting schedules for various lighting tasks. In some embodiments, luminaire 100 can guarantee a level of light output based upon such a database of luminance characterization profiles, and supplemented by feedback adjustments of lumen output levels based upon field measurements within luminaire 100.

To create a record in the luminance characterization profile, it is helpful to know the following information:

a) the Ballast Manufacturer, which is not necessarily the same entity as the lamp manufacturer;
b) the Lamp Manufacturer, which is not necessarily the same entity as the Ballast Manufacturer;
c) Ballast Manufacturer;
d) Model of Ballast: this is the manufacturer's model number.
e) Ballast Type: for HID applications, this is either CWA or CWI.
f) Ballast Wattage;
g) Lamp Manufacturer;
h) Lamp Type: lamps are manufactured containing different types of gases (e.g., HPS and MV are two of the most common);
i) Lamp Model;
j) Lamp Wattage; and
k) Lamp Filaments.

Once the database of luminance characterization profiles 900 has been created, it can be used to program a controller 114 that is installed in a new luminaire 100, or one that is being retrofitted into an older luminaire. Such data can increase the accuracy of the correlation of lumen level output with dimming levels 906 or switch settings 606. Additionally, the database can be used when luminaires are repaired and new ballasts or lamps are installed that are not exactly like the original components. Thus, if a luminaire must have a different ballast installed, the database can be used to calibrate the luminaire for the different ballast. This means that the database can help maintain accurate lumen level outputs as the older luminaires are repaired with different or newer parts.

This disclosure is intended to explain how to fashion and use various embodiments in accordance with the invention, rather than to limit the true, intended, and fair scope and spirit thereof. The foregoing description is not intended to be exhaustive or to limit the invention to the precise form disclosed. Modifications or variations are possible in light of the above teachings. The embodiment(s) were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system for controlling the output of a streetlight comprising:
   a streetlight;
   a light sensor coupled with the streetlight;
   a controller coupled to the streetlight;
   a radio transceiver coupled with said controller;
   at least a second radio transceiver coupled to a second controller;
   a central controller;
   wherein said central controller is operable to generate a message to command said controller to change an output of said streetlight; wherein the message is transmitted from said central controller via said second controller to the radio transceiver; and
   further wherein said controller uses an input from said light sensor to determine an adjustment to said output.

2. The system of claim 1 wherein said message is generated in response to a request to reduce electrical demand.

3. The system of claim 2 wherein said request is provided by a power company.

4. The system of claim 1 wherein said message is generated from a schedule.

5. A streetlight controller for controlling a luminance output of an associated streetlight that is coupled thereto, the streetlight controller comprising:
   a light sensor coupled with the associated streetlight;
   a radio transceiver operable to receive a message from an other transmitter;
   one or more switches selectively operative to control the luminance output; and
   a processor coupled to the light sensor, the radio transceiver, and the one or more switches and operative to selectively control the one or more switches and thereby control the luminance output,
   the processor further cooperatively operable with the radio transceiver to interpret the message from the other radio transceiver, the message including an indicated change in the luminance output of the associated streetlight,
   wherein the processor uses an input from the light sensor and the indicated change to selectively control the one or more switches to change the luminance output.

6. The streetlight controller of claim 5 wherein the processor in cooperation with the radio transceiver receives and interprets a message to reduce the luminance output to thereby reduce electrical demand.

7. The streetlight controller of claim 5 wherein the processor in cooperation with the radio transceiver receives and interprets a message from an other transmitter, the other transmitter comprising a second transmitter that is part of a mesh network.

8. The streetlight controller of claim 5 wherein the processor in cooperation with the radio transceiver receives and interprets a message from a central controller, the message responsive to a request to reduce power demand, the request originating from a power company.

9. The streetlight controller of claim 5 wherein the processor in cooperation with the radio transceiver receives and interprets a message to change the luminance output, responsive to an emergency.

10. The streetlight controller of claim 5 wherein the processor in cooperation with the radio transceiver receives and interprets the message, which is generated from a schedule.

11. The streetlight controller of claim 5 wherein the processor in cooperation with the radio transceiver receives and interprets the message from one of an emergency vehicle transmitter, a power company transmitter, and an alarm transmitter.

12. A method of controlling a luminance output of a streetlight, the method comprising:

receiving, at a radio transceiver a message from a central controller;

interpreting, at a processor, the message, the message including an indicated change to the luminance output;

obtaining an input from a light sensor; and responsive to the message and the input, adjusting the luminance output in accordance with the indicated change.

13. The method of claim 12 wherein the message from the central controller is responsive to a request to reduce power consumption.

14. The method of claim 12 wherein the message from the central controller is responsive to a request to reduce power consumption, the request provided by a power company.

15. The method of claim 12 wherein the message from the central controller is responsive to an emergency.

16. The method of claim 12 wherein the message from the central controller is provided via a mesh network.

17. The method of claim 12 wherein the adjusting the luminance output further comprises selectively enabling a plurality of switches to control power supplied to a lamp from a ballast.

* * * * *